3,083,079
PROCESS FOR REMOVAL OF MERCURIC IONS
FROM ELECTROLYTIC SOLUTIONS
Russel C. Calkins, Richard A. Mock, and Leo R. Morris, Midland, Mich., assignors to The Dow Chemical Company, Midland, Mich., a corporation of Delaware
No Drawing. Filed Dec. 24, 1958, Ser. No. 782,630
5 Claims. (Cl. 23—87)

This invention is concerned with an improved process for the removal of mercuric ions from brines containing halide ions and mercury ions and is more particularly concerned with a process for removing mercuric ions from brines containing halide ions, mercury ions and other metal ions.

The present invention is based on the discovery that mercuric ions can be selectively removed from brines containing halide ions and metal ions, particularly the alkali and alkaline earth metal ions, e.g. sodium, calcium, and the like, by contacting the brine at a pH of 9.5 or above, with an insoluble homopolymer or copolymer prepared from at least one monomer of the group consisting of vinylphenyl aliphatic primary and secondary aminomonocarboxylic acids and mixtures containing a predominant amount by weight of at least one such aminomonocarboxylic acid and a minor proportion e.g. up to 20% of divinylbenzene.

It has been further found that the mercuric ions may be readily recovered from the resin chelate by elution with chloride solutions having a pH value below 9.5.

It is necessary that the pH of the brine be maintained at 9.5 or above for efficient mercury removal, and is desirably maintained at about 10 to 11, although higher pH values may be used. It is desirable to have resin properties which will permit a minimum contact time. A desirable physical form which these resins could assume would be as small, 0.15 mm. diameter or less, resilient beads, which would swell and shrink in use by as much as 50%. In this form the resins pick up mercury most rapidly, and are most easily eluted. The resilient beads are also more stable to mechanical breakdown. The contact time is dependent upon such variables as the physical condition of the resin, the temperature of operation, the concentration of ions in the feed solution, and the allowable concentration in the effluent and must be determined by the economic considerations for each particular case.

Among the homopolymers and copolymers suitable for use in this invention are those containing monocarboxylic amino acid residues such as, for example, vinylbenzylisovaline, vinylbenzylalanine, vinylbenzyl-2-aminobutyric acid, vinylbenzylvaline, vinylbenzylleucine, vinylbenzylglycine, N,N-bis(vinylbenzyl)glycine, and vinylphenylglycine.

A method for making resinous polymers suitable for use in this invention is described in U.S. Patent No. 2,840,603.

Mercury is recovered from the resin by elution with solutions having pH values below 9.5. Elution operation is advantageously performed at pH values less than 2 in concentrated brine, e.g. 5 N sodium chloride. Removal is facilitated by the presence of a high concentration of halide ions, e.g. chloride ions, to tie up mercury as the complex chloro anion, $HgCl_4^=$, as fast as it is released. Thus, a solution of 1 N HCl in 5 N NaCl is more efficient as an eluting agent than a solution of 1 N HCl alone.

The process of the present invention may be further illustrated, but is not to be construed as limited, by the following examples:

Example I

A synthetic brine containing 280 grams per liter of sodium chloride, 2.45 grams per liter of calcium chloride and 15 parts per million of mercuric ions was prepared and adjusted to pH 11 by the addition of 1 N sodium hydroxide solution. This brine was then passed through a bed of a copolymer of vinylphenyl glycine and N,N-bis(vinylbenzyl)glycine, prepared from a monomer mixture containing 5% of N,N-bis(vinylbenzyl) glycine, at a flow rate of 1.63 gallons per pound per hour at room temperature. The effluent brine contained 0.3 part per million of mercuric ions. The mercury was recovered from the resin bed by elution with sodium chloride solution at pH 7.

Example II

Treatment of a brine similar to that employed in Example I with a copolymer of N-(vinylbenzyl) glycine and divinylbenzene prepared from a monomer mixture containing 1% divinylbenzene under similar conditions results in an equivalent removal of mercuric ions from the solution.

Various modifications may be made in the present invention without departing from the spirit or scope thereof, and it is understood that we limit ourselves only as defined in the appended claims.

We claim:

1. The process of removing mercuric ions from brines containing halide ions and calcium ions which comprises contacting said solution, at a pH of at least 9.5, with an insoluble polymer prepared from at least one monomer of the group consisting of (a) vinylphenyl aliphatic primary and secondary aminomonocarboxylic acids, and (b) mixtures of at least one such aminomonocarboxylic acid and a minor proportion of divinylbenzene, and thereafter recovering the mercury from the resin by elution with a chloride solution at a pH of not more than 7.

2. The process of claim 1 wherein the resin is a copolymer of N-(vinylbenzyl) glycine and minor proportion of divinylbenzene.

3. The process of claim 1 wherein the pH of the mercury-containing solution is from about 10 to about 11.

4. The process of selectively removing mercuric ions from brines containing halide ions and calcium ions which comprises contacting said solution, at a pH of at least 9.5, with an insoluble copolymer prepared from a mixture of vinylphenylaliphatic primary aminomonocarboxylic acids and vinylbenzyl secondary aminomonocarboxylic acids, and thereafter recovering the mercury from the resin by elution with a chloride solution at a pH of not more than 7.

5. The process of claim 4 wherein the resin is a copolymer of vinylphenylglycine and N,N-bis(vinylbenzyl) glycine, containing a predominant proportion of vinylphenylglycine.

References Cited in the file of this patent
UNITED STATES PATENTS
2,840,603    Mock et al. _____ June 24, 1958
OTHER REFERENCES
Hale: "Chelatine Resins," Research, vol. 9, 1956, pages 104–108.